US010103371B2

(12) United States Patent  
Yeh

(10) Patent No.: US 10,103,371 B2  
(45) Date of Patent: Oct. 16, 2018

(54) ACTUATING STRUCTURE OF BATTERY SAFETY VALVE

(71) Applicant: INDUSTRIAL TECHNOLOGY RESEARCH INSTITUTE, Hsinchu (TW)

(72) Inventor: Sheng-Fa Yeh, Miaoli (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 290 days.

(21) Appl. No.: 15/244,059

(22) Filed: Aug. 23, 2016

(65) Prior Publication Data

US 2017/0187020 A1  Jun. 29, 2017

(30) Foreign Application Priority Data

Dec. 25, 2015  (TW) .............................. 104143882 A

(51) Int. Cl.
*H01M 2/12* (2006.01)
*F16K 17/40* (2006.01)
(Continued)

(52) U.S. Cl.
CPC ........... *H01M 2/1241* (2013.01); *F16K 17/16* (2013.01); *F16K 17/403* (2013.01); *F16K 31/08* (2013.01);
(Continued)

(58) Field of Classification Search
CPC ........ F16K 17/403; F16K 31/08; F16K 17/16; H01M 2/1241; H01M 2/345; H01M 2200/20; H01M 2/26
(Continued)

(56) References Cited

U.S. PATENT DOCUMENTS 8,236,439 B2  8/2012  Byun et al.
9,012,050 B2  4/2015  Byun et al.
(Continued)

FOREIGN PATENT DOCUMENTS

CN  201975473 U  9/2011
CN  102208583 A  10/2011
(Continued)

OTHER PUBLICATIONS

Korean Office Action dated Sep. 1, 2017.
(Continued)

*Primary Examiner* — Jonathan G Jelsma
*Assistant Examiner* — Omar M Kekia
(74) *Attorney, Agent, or Firm* — Rabin & Berdo, P.C.

(57) ABSTRACT

An actuating structure of battery safety valve includes an end plate, a safety valve, a positive-terminal conductive plate, a negative-terminal conductive plate, a ventilate plate and an actuating plate. A positive terminal and a negative terminal penetrate through the end plate and the safety valve. The positive-terminal and the negative-terminal conductive plates are disposed on the end plate and extended from the positive terminal and the negative terminal to the safety valve, respectively. The ventilate plate is disposed on the end plate and corresponding to the safety valve. The actuating plate is disposed between the ventilate plate and the safety valve, and restricted under a normal condition by the safety valve. When an internal pressure of the battery exceeds a breaking pressure of the safety valve, the actuating plate is released, so that an electric connection path is formed between the positive and the negative terminals.

20 Claims, 9 Drawing Sheets

(51) Int. Cl.
*H01M 2/34* (2006.01)
*F16K 31/08* (2006.01)
*F16K 17/16* (2006.01)
*H01M 2/26* (2006.01)

(52) U.S. Cl.
CPC ............ *H01M 2/26* (2013.01); *H01M 2/345* (2013.01); *H01M 2200/20* (2013.01)

(58) Field of Classification Search
USPC .......................................................... 429/72
See application file for complete search history.

(56) References Cited

U.S. PATENT DOCUMENTS

| | | | |
|---|---|---|---|
| 2011/0039136 | A1 | 2/2011 | Byun et al. |
| 2012/0251852 | A1* | 10/2012 | Kim ...................... H01M 2/345 429/61 |
| 2013/0029191 | A1 | 1/2013 | Byun et al. |
| 2013/0115511 | A1 | 5/2013 | Han et al. |
| 2014/0205872 | A1* | 7/2014 | Cai ...................... H01M 2/345 429/61 |
| 2015/0079426 | A1 | 3/2015 | Chen et al. |
| 2015/0104672 | A1 | 4/2015 | Cai et al. |
| 2015/0132619 | A1 | 5/2015 | He et al. |
| 2015/0188119 | A1 | 7/2015 | Gao et al. |
| 2015/0207133 | A1 | 7/2015 | Holl et al. |
| 2015/0221913 | A1 | 8/2015 | Engel et al. |

FOREIGN PATENT DOCUMENTS

| | | |
|---|---|---|
| CN | 104362265 A | 2/2015 |
| CN | 104377338 A | 2/2015 |
| CN | 204155966 U | 2/2015 |
| CN | 204155997 U | 2/2015 |
| CN | 204167372 U | 2/2015 |
| CN | 204216110 U | 3/2015 |
| CN | 104577001 A | 4/2015 |
| CN | 204303875 U | 4/2015 |
| JP | 2002-358943 A | 12/2002 |
| JP | 2011-124214 A | 6/2011 |
| JP | 3189700 U | 3/2014 |
| JP | 2014-086140 A | 5/2014 |
| JP | 2016-537780 A | 12/2016 |
| WO | WO 2015-104198 A1 | 7/2015 |
| WO | WO-2015117716 A1 | 8/2015 |
| WO | WO-2015117772 A1 | 8/2015 |

OTHER PUBLICATIONS

Japanese Office Action dated Oct. 17, 2017.
Susanne Wilken et al, "Ionic liquids in lithium battery electrolytes: Composition versus safety and physical properties", Journal of Power Sources 275, Feb. 1, 2015, 935-942.
Junli Shi et al., "Sandwich-like heat-resistance composite separators with tunable pore structure for high power high safety lithium ion batteries", Journal of Power Sources 271, Dec. 20, 2014, 134-142.
Harry W. Rollins et al., "Fluorinated phosphazene co-solvents for improved thermal and safety performance in lithium-ion battery electrolytes", Journal of Power Sources 263, Oct. 2014, 66-74.
Meng-Lun Lee et al., "Improvement in safety and cycle life of lithium-ion batteries by employing quercetin as an electrolyte additive", Journal of Power Sources 214, Sep. 2012, 251-257.
Gumjae Park et al, "The important role of additives for improved lithium ion battery safety", Journal of Power Sources 189, Apr. 1, 2009, 602-606.
Japanese Office Action dated Jan. 30, 2018.

* cited by examiner

ACTUATING STRUCTURE OF BATTERY SAFETY VALVE

CROSS-REFERENCE TO RELATED APPLICATION

The present application is based on, and claims priority from, Taiwan Application Serial Number 104143882, filed on Dec. 25, 2015, the disclosure of which is hereby incorporated by reference herein in its entirety.

TECHNICAL FIELD

The technical field relates to an actuating structure of battery safety valve.

BACKGROUND

When a battery is used improperly, such as overcharge, internal materials of the battery will generate gas by a decomposition reaction due to an excessive voltage. Because the battery's structure is a sealed structure, the internal pressure of the battery will be increased by the generated gas. The temperature of the battery will also be increased due to the phenomena of the decomposition reaction or the energy consumption by the resistance. Therefore, a safety valve is provided in the battery to relieve the pressure before the internal pressure is increased. The safety valve is a kind of stress actuating structure, and known technologies improve the battery design only on the pressure control of the safety valve.

SUMMARY

According to an embodiment of the disclosure, an actuating structure of battery safety valve is adapted to dispose on a battery. The actuating structure of battery safety valve comprises an end plate, a safety valve, a positive-terminal conductive plate, a negative-terminal conductive plate, a ventilate plate and an actuating plate. The end plate is disposed on a housing of the battery, and has a first surface and a second surface, wherein the first and the second surfaces are opposite to each other. A positive terminal and a negative terminal of the battery penetrate through the end plate, and the safety valve is disposed on the first surface of the end plate. The positive-terminal conductive plate is disposed on the second surface and extended from the positive terminal to a first position corresponding to the safety valve. The negative-terminal conductive plate is disposed on the second surface and extended from the negative terminal to the first position corresponding to the safety valve. The ventilate plate is disposed on the second surface and a second position of the ventilate plate corresponds to the first position of the safety valve. The actuating plate is disposed between the ventilate plate and the safety valve and restricted in a fixed position under a normal condition by the safety valve. A rotation shaft is disposed between the actuating plate and the ventilate plate. When an internal pressure of the battery exceeds a breaking pressure of the safety valve, the actuating plate is released to rotate and contact with the positive-terminal and the negative-terminal conductive plates, respectively, so that an electric connection path is formed between the positive and the negative terminals.

The foregoing will become better understood from a careful reading of a detailed description provided herein below with appropriate reference to the accompanying drawings.

DETAILED DESCRIPTION OF DISCLOSED EMBODIMENTS

Figure 1:
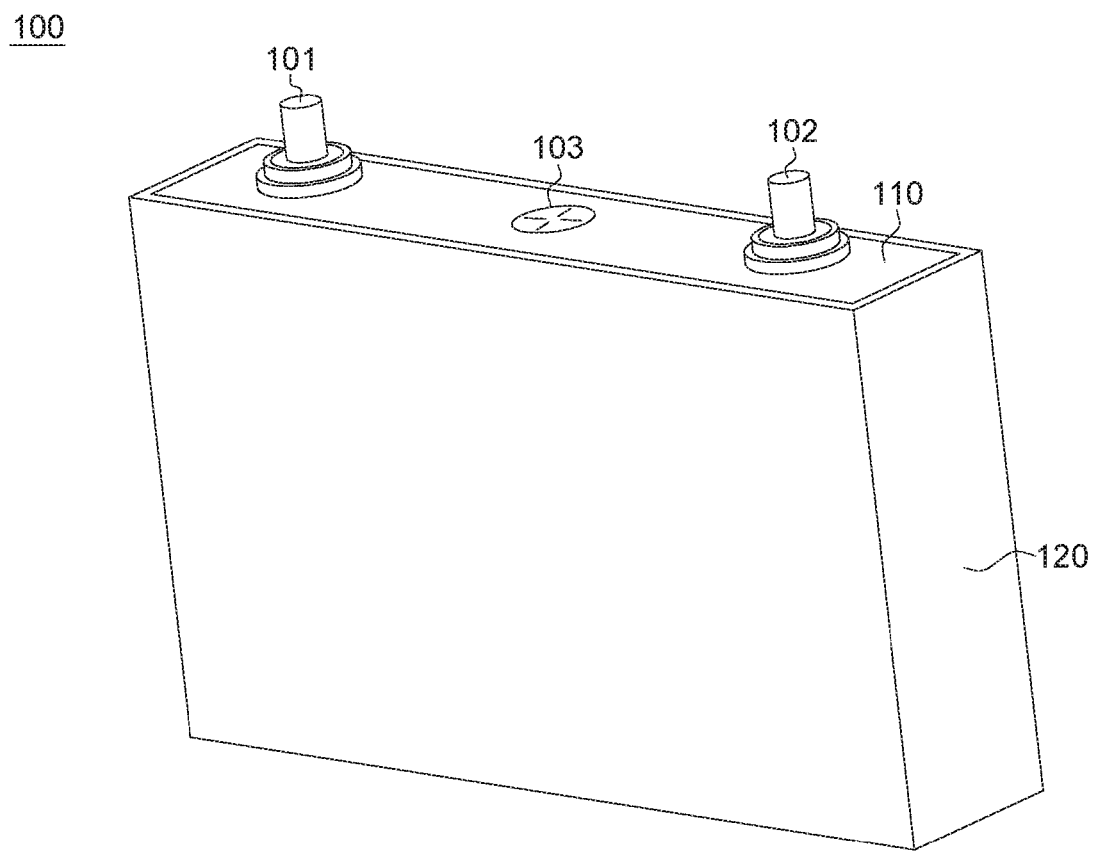
FIG. 1 is a schematic view of a main body of a battery having an actuating structure of battery safety valve, according to an exemplary embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

In an exemplary embodiment, an actuating structure of battery safety valve is adapted to dispose on a battery to avoid the exorbitance of the internal pressure in the battery. When the internal pressure of the battery exceeds a breaking pressure that a housing bears, the battery will explode and spout plenty of flammable gas from a point with the weakest strength. If a concentration of the flammable gas and a temperature of the battery reach a flammable situation, a spark may make a fire by lighting the flammable gas and affect the safety of people. Therefore, in the design of a safety valve in the disclosure, the flammable gas is relieved by breaking the safety valve to decrease the probability of inflammation. In addition, when the battery is in a danger situation, a short circuit between a positive terminal and a negative terminal by a short-circuit device may discharge immediately, so that the battery is no longer in a full power state and increases the security of the battery. For this reason, the disclosure provides an actuating structure for breaking a safety valve by a stress actuating mechanism and makes a short circuit between a positive terminal and a negative terminal, and then the total energy of the battery decreases to reach the purpose of the security.

Besides, in the security mechanism of the battery, when the short circuit between the positive terminal and the negative terminal happens and discharges, the increase of a temperature of the battery by a heating of an impedance needs more time than the increase of a pressure by a chemical reaction, so that the increase of the temperature of the battery by the short circuit may be controlled within the limit by the regulation of the security.

Example 1

Figure 2:
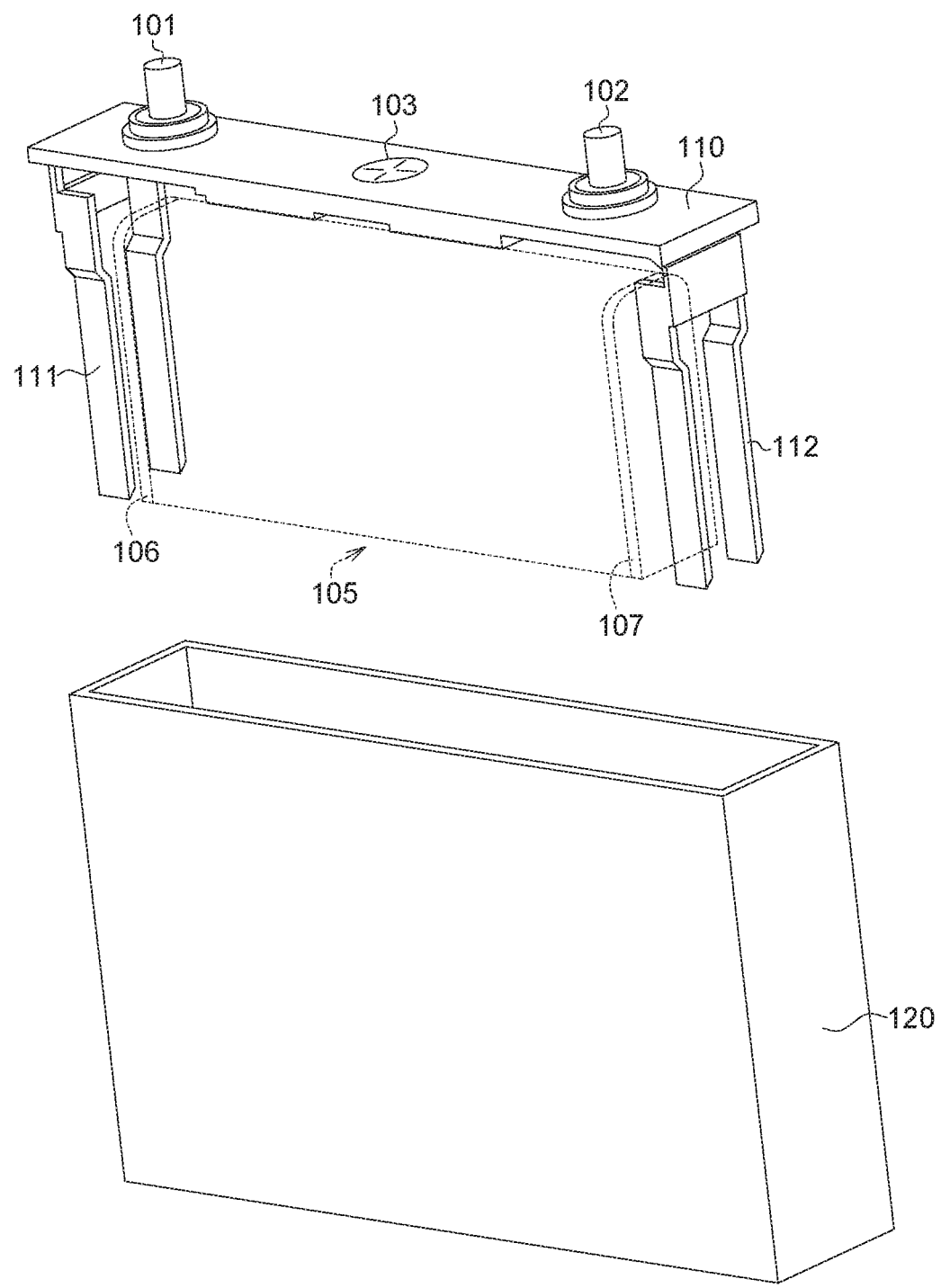
FIG. 2 is an exploded view of the main body of the battery shown in FIG. 1.

Please refer to FIG. 1 and FIG. 2. FIG. 1 is a schematic view of a main body of a battery 100 having an actuating structure of battery safety valve 108 according to an exemplary embodiment. FIG. 2 is an exploded view of a main body of the battery 100. The battery 100 comprises a positive terminal 101, a negative terminal 102, an end plate 110, a housing 120, and a battery polar winding 105 disposed in the housing 120 and sealed by the end plate 110. The battery polar winding 105 is made by winding a positive plate, a negative plate (not shown in figure), and a separator (such as an insulating film, not shown in figure) which is between the positive plate and the negative plate, wherein two ends of the battery polar winding 105 are a positive conductor 106 and a negative conductor 107 respectively. The battery polar winding 105 comprises active substances divided into a positive pole and a negative pole. The separator between the positive and the negative plates may block the flow of electrons and lead ions passing through to control the storing and the discharge of an electric current, so as to form a potential difference. The battery 100 has a seal structure. When the battery 100 is used improperly such as overcharge or puncture, the battery polar winding 105 may produce heat and flammable gas which is full of the housing 120 and then produce an internal pressure. If the internal pressure of the battery 100 exceeds a breaking pressure that a housing 120 bears, a safety valve 103 will be broken to relieve an over-pressure and prevent the housing 120 from exploding.

The materials of the housing 120 and the end plate 110 of the battery 100 disposed a first conduct handle 111 and a second conduct handle 112 respectively. One end of the first conduct handle 111 and one end of the second conduct handle 112 extend to the housing 120 of the battery 100, and are coupled to the positive conductor 106 and the negative conductor 107 of the battery polar winding 105, respectively. The other end of the first conduct handle 111 is coupled to a positive-terminal conductive plate 121 (refer to FIG. 3B) and the positive terminal 101. The other end of the second conduct handle 112 is coupled to a negative-terminal conductive plate 122 (refer to FIG. 3B) and the negative terminal 102. Therefore, the positive conductor 106 and the negative conductor 107 of the battery polar winding 105 couple to the positive terminal 101 and the negative terminal 102, respectively.

Figure 3A:
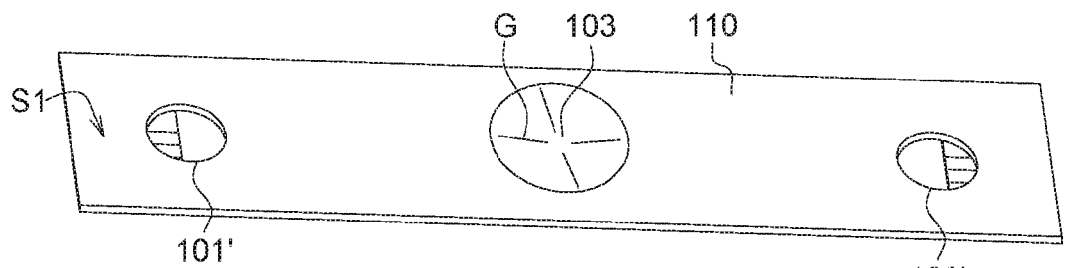
FIG. 3A is a top view of an actuating structure of battery safety valve, according to an exemplary embodiment.
Figure 3B:
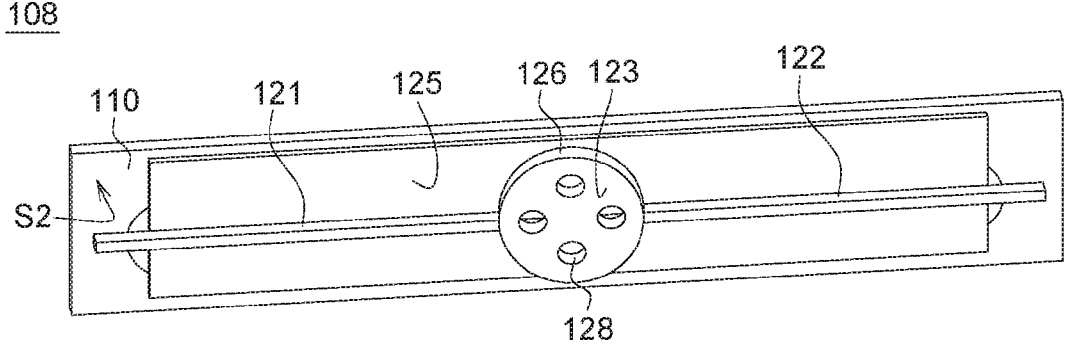
FIG. 3B is a bottom view of an actuating structure of battery safety valve, according to an exemplary embodiment.
Figure 3C:
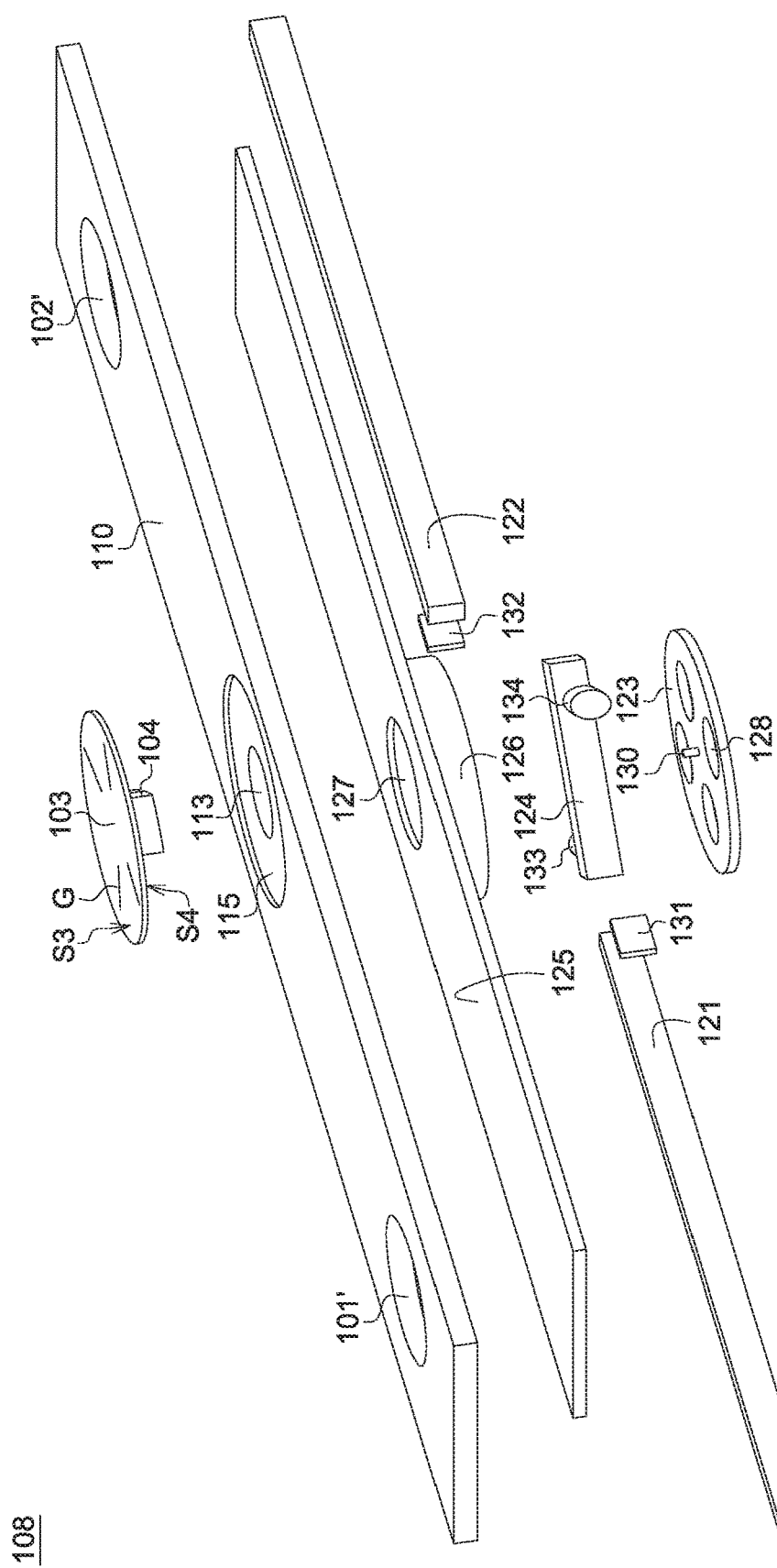
FIG. 3C is an exploded view of an actuating structure of battery safety valve, according to an exemplary embodiment.

Please refer to FIG. 3A to FIG. 3C. FIG. 3A is a top view of an actuating structure of battery safety valve 108 according to an exemplary embodiment. FIG. 3B is a bottom view of an actuating structure of battery safety valve 108 according to an exemplary embodiment. FIG. 3C is an exploded view of an actuating structure of battery safety valve 108 according to an exemplary embodiment. In an embodiment, an actuating structure of battery safety valve 108 comprise an end plate 110, a safety valve 110 which is disposed on a first surface S1 of the end plate 110, a positive-terminal conductive plate 121 which is disposed on a second surface S2 of the end plate 110, a negative-terminal conductive plate 122, a ventilate plate 123, an actuating plate 124, and an insulating layer 125.

As shown in FIG. 3A, the end plate 110 is, for example, long bar in shape and when the end plate 110 assembles with the battery 100, the positive terminal 101 and the negative terminal 102 of the battery 100 correspondingly pass through a positive terminal hole 101' and a negative terminal hole 102', respectively, wherein the positive terminal hole 101' and the negative terminal hole 102' are close to the two opposite sides between the long sides of the end plate 110, respectively. The end plate 110 has a first surface S1 and a second surface S2, wherein the first surface S1 and the second surface S2 are opposite to each other, and the safety valve 103 disposes on the center of the first surface S1 of the end plate 110. Specifically, please refer to FIG. 3C, the first surface S1 of the end plate 110 has a carrying part 115 which is concave toward the second surface S2 and configured to dispose and fix the safety valve 103. In addition, the carrying part 115 has a first through hole 113, and a diameter of the safety valve 103 is greater than a diameter of the first through hole 113. Please refer to FIG. 3B, the positive-terminal conductive plate 121 and the negative-terminal conductive plate 122 are, for example, long bars in shape and disposed on the second surface S2 of the end plate 110. The positive-terminal conductive plate 121 and the negative-terminal conductive plate 122 extend along the long side of the end plate 110. The positive-terminal conductive plate 121 extends from the positive terminal 101 to a position on the second surface S2 where the safety valve 103 corresponds to, and the negative-terminal conductive plate 122 extends from the negative terminal 102 to the position on the second surface S2 where the safety valve 103 corresponds to. The material of the positive-terminal conductive plate 121 is aluminum, and the material of the negative-terminal conductive plate 122 is copper, but the scope of the disclosure is not limited thereto.

In one embodiment of the disclosure, a surface of the ventilate plate 123 has a plurality of openings 128 penetrating though the ventilate plate 123 and there is no limitation on the number and the size of the openings 128, and a rotation shaft 130 is disposed at the center of the ventilate plate 123. Besides, the ventilate plate 123 and the safety valve 103 are opposite to each other, and the safety valve 103 is soldered and fixed on the end plate 110 in a laser solder manner. The safety valve 103 has a third surface S3 and an opposite fourth surface S4, and there is at least one pressure broken groove G such as V-shaped groove set on the third surface S3 or the fourth surface S4 so that the safety valve 103 breaks as a result of the change of the pressure. The pressure broken groove G is thinner than other surrounding planking, therefore when the internal gas of the battery 100 leaks out of the battery 100 through the openings 128 of the ventilate plate 123, the safety valve 103 will break or deform such as bulge outward from the thinner pressure broken groove G to relieve the overload pressure.

Please refer to FIG. 3B, when the material of the end plate 110 is metal such as aluminum, an insulating layer 125 such as a polyester sheet is disposed on the second surface S2 of the end plate 110. The insulating layer 125 not only isolates between the positive-terminal conductive plate 121 and the end plate 110, but also isolates between the negative-terminal conductive plate 122 and the end plate 110. Therefore, it will prevent the positive-terminal conductive plate 121 and the negative-terminal conductive plate 122 from contacting with the end plate 110 and causing a short circuit. In addition, the insulating layer 125 has a ventilate plate fixed base 126 and a second through hole 127. The ventilate plate 123 opposite to the safety valve 103 is fixed and disposed in the a ventilate plate fixed base 126, and the second through hole 127 is disposed between the ventilate plate 123 and the safety valve 103. In another embodiment, when the material of the end plate 110 is non-conductive, it is needless to dispose the insulating layer 125 on the second surface S2 of the end plate 110, and the ventilate plate fixed base 126 may be disposed on the second surface S2 of the non-conductive end plate 110 directly.

Please refer to FIG. 3C, a position limiting structure 104 is disposed on the fourth surface S4 of the safety valve 103 and the position limiting structure 104 extends to the second surface S2 through the first through hole 113. Furthermore, an actuating plate 124 is disposed between the ventilate plate 123 and the safety valve 103, and is limited in a fixed position by the safety valve 103 under a normal condition. Specifically, the rotation shaft 130 is disposed between the ventilate plate 123 and the actuating plate 124. The rotation shaft 130 may be fixed on the ventilate plate 123 or the actuating plate 124, and the ventilate plate 123 and the actuating plate 124 pin-joint to each other through the rotation shaft 130, so the actuating plate 124 is capable of rotating with respect to the ventilate plate 123. Moreover, a position of the ventilate plate 123 is opposite to a position of the safety valve 103, and the second through hole 127 of the insulating layer 125 connects to the first through hole 113 of the end plate 110. The material of the ventilate plate 123 is ceramics or the material similar to copper, and the material of the actuating plate 124 is copper or aluminum.

Figure 4A:
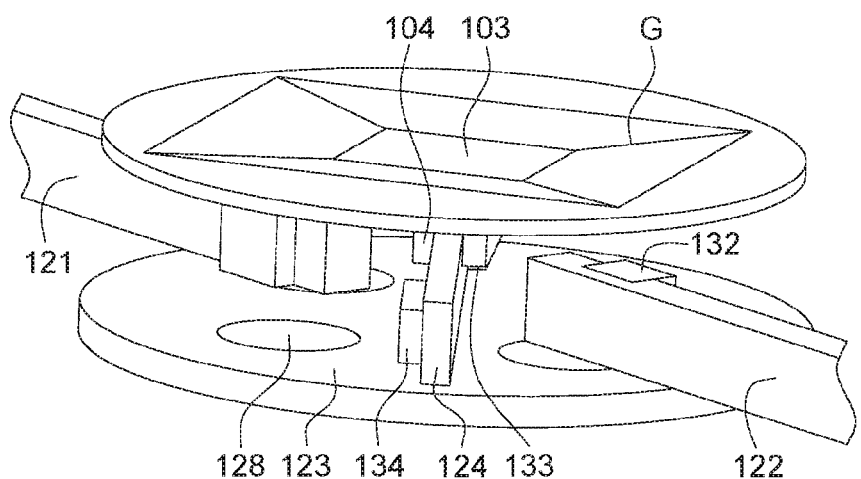
FIG. 4A to FIG. 4D are schematic views illustrating the configuration of an actuating plate, a positive-terminal conductive plate and a negative-terminal conductive plate.
Figure 4B:
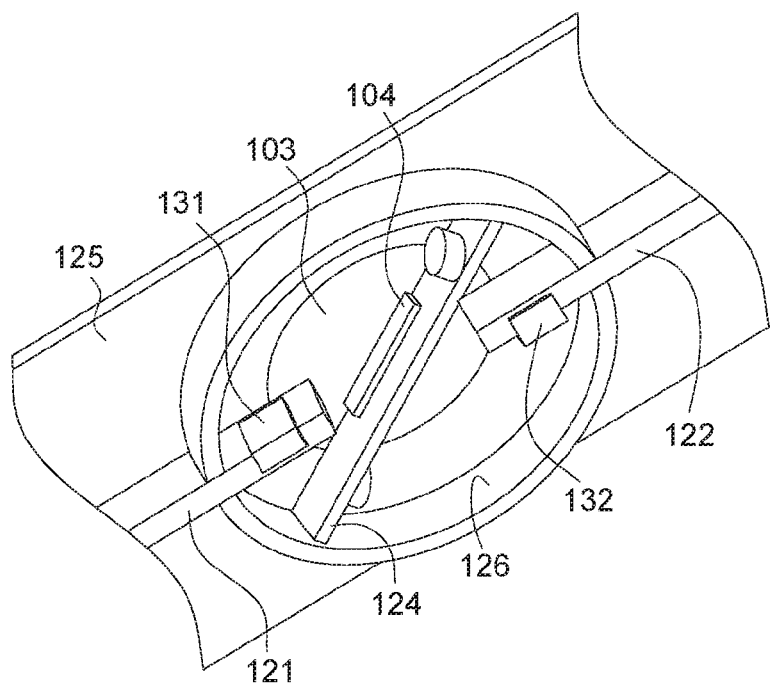

Please refer to FIG. 3C, and FIG. 4A to FIG. 4D at the same time. FIG. 4A to FIG. 4D are schematic views illustrating the configuration of the actuating plate 124, the positive terminal conductive plate 121 and the negative terminal conductive plate 122. In one embodiment, a position limiting structure 104 of the safety valve 103 such as two chips is configured to fix the actuating plate 124, so the actuating plate 124 is limited in a fixed position without rotating under a normal condition. As shown in FIG. 4A and FIG. 4B, the materials of the actuating plate 124, the positive-terminal conductive plate 121 and the negative-terminal conductive plate 122 are conductive such as copper or aluminum, and the actuating plate 124 is fixed by the position limiting structure 104, so that the actuating plate 124 will not contact and conduct with the positive-terminal conductive plate 121 and the negative-terminal conductive plate 122 which are extended to a position on the second surface S2 where the safety valve 103 corresponds to, respectively. In addition, please refer to FIG. 4C and FIG. 4D, when the safety valve 103 is broken or deformed, the position limiting structure 104 will release and free the actuating plate 124. Two ends of the actuating plate 124 are driven by a magnetic force or an elastic force and free to rotate. The two ends of the actuating plate 124 contact with the positive-terminal conductive plate 121 and the negative-terminal conductive plate 122, respectively, to form an electrically connecting path between the positive terminal 101 and the negative terminal 102 (please refer to FIG. 3A).

Figure 4C:
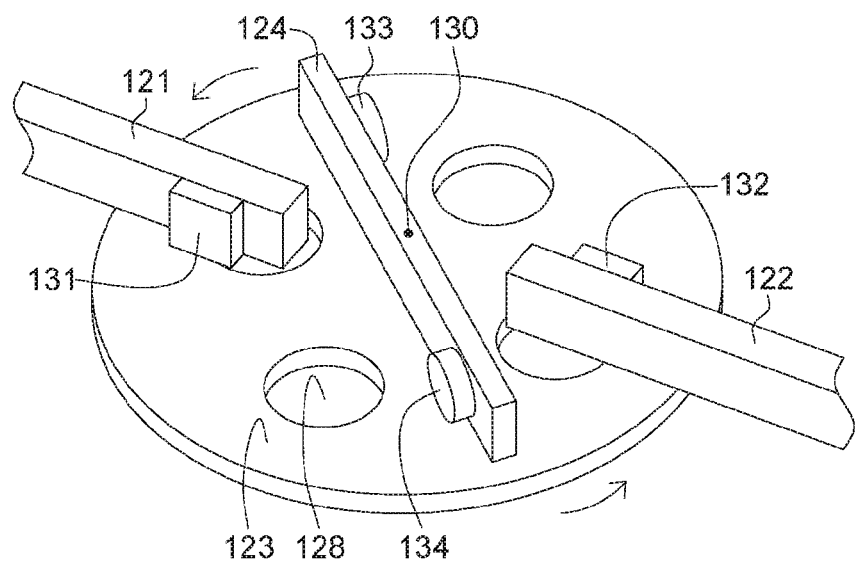

As shown in FIG. 4C, an end of the positive-terminal conductive plate 121 which extends to the position on the second surface S2 where the safety valve 103 corresponds to has a first magnetic matter 131, and an end of the negative-terminal conductive plate 122 which extends to the position on the second surface S2 where the safety valve 103 corresponds to has a second magnetic matter 132. The first magnetic matter 131 and the second magnetic matter 132 are made from a permeable material or a magnetized material, like NdFeB permanent magnet such as N38UH, N40UH, N35EH, N38EH, N30AH, or N33AH. Besides, two ends of the actuating plate 124 respectively have a first magnetic element 133 and a second magnetic element 134. The first magnetic element 133 and the second magnetic element 134 are made from permeable material or magnetized material, like NdFeB permanent magnet such as N38UH, N40UH, N35EH, N38EH, N30AH, or N33AH. In one embodiment, the maximum magnetic energy product (BHmax) of the aforesaid NdFeB permanent magnet has a range from 220 KJ/m$^3$ to 330 KJ/m$^3$, and the maximum allowable working temperature of the aforesaid NdFeB permanent magnet is greater than 500° C. which is much greater than an allowable working temperature (120° C.) of the battery polar winding 105, so that the magnet is not influenced by a high temperature environment.

When the actuating plate 124 is released, the first magnetic matter 131 and the first magnetic element 133 attract to each other by a magnetic force, and the second magnetic matter 132 and the second magnetic element 134 attract to each other by another magnetic force, so as to drive the ends of the actuating plate 124 to rotate with respect to the rotation shaft 130. A magnetic force between two substances is inversely proportional to a distance between the two substances, so the shorter the distance is, the stronger the magnetic force is. Then, there is stronger magnetic driven force to drive the two ends of the actuating plate 124 more contacting with the positive-terminal conductive plate 121 and the negative-terminal conductive plate 122 respectively, and it may reduce the resistance.

Figure 4D:
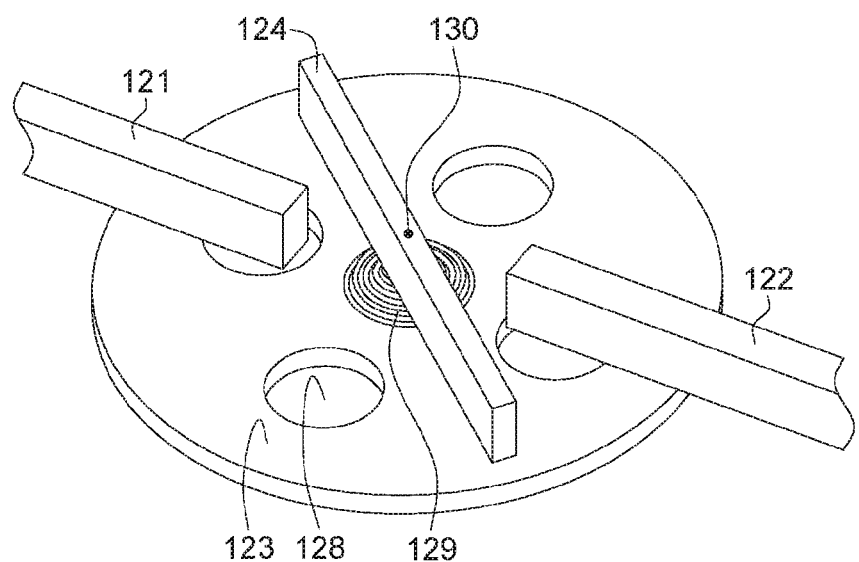

Moreover, as shown in FIG. 4D, in addition to being driven by the magnetic force, the actuating plate 124 may be driven by an elastic force. In an embodiment of the disclosure, a spring 129 is set between the actuating plate 124 and the ventilate plate 123. The spring 129 may be a volute spiral spring or a compression spring. One end of the spring 129 is fixed on the actuating plate 124, and the other end of the spring 129 is fixed on the ventilate plate 123. When the actuating plate 124 is limited in the fixed position under a normal condition, the spring 129 stores the elastic force. When the actuating plate 124 is released, the spring 129 releases the stored elastic force to drive two ends of the actuating plate 124 to rotate with respect to the rotation shaft 130, and two ends of the actuating plate 124 contact with the positive-terminal conductive plate 121 and the negative-terminal conductive plate 122, respectively.

As aforementioned, in the disclosure, the actuating structure of battery safety valve 108 drives the actuating plate 124 to contact with the positive-terminal conductive plate 121 and the negative-terminal conductive plate 122 by the stress actuating mechanism and to occur an short circuit, so as to decreases the total energy of the battery to reach the purpose of the security.

In addition, in the above-mentioned embodiments, the actuating structure of battery safety valve 108 is set inward the inside of the battery 100 according to the second surface S2 of the end plate 110. However, in other embodiments, the actuating structure of battery safety valve 108 may be set inward the inside of the battery 100 according to the first surface S1 of the end plate 110. The working mechanism is the same as described in the above-mentioned embodiments, and it is not described herein again.

Example 2

Figure 5:
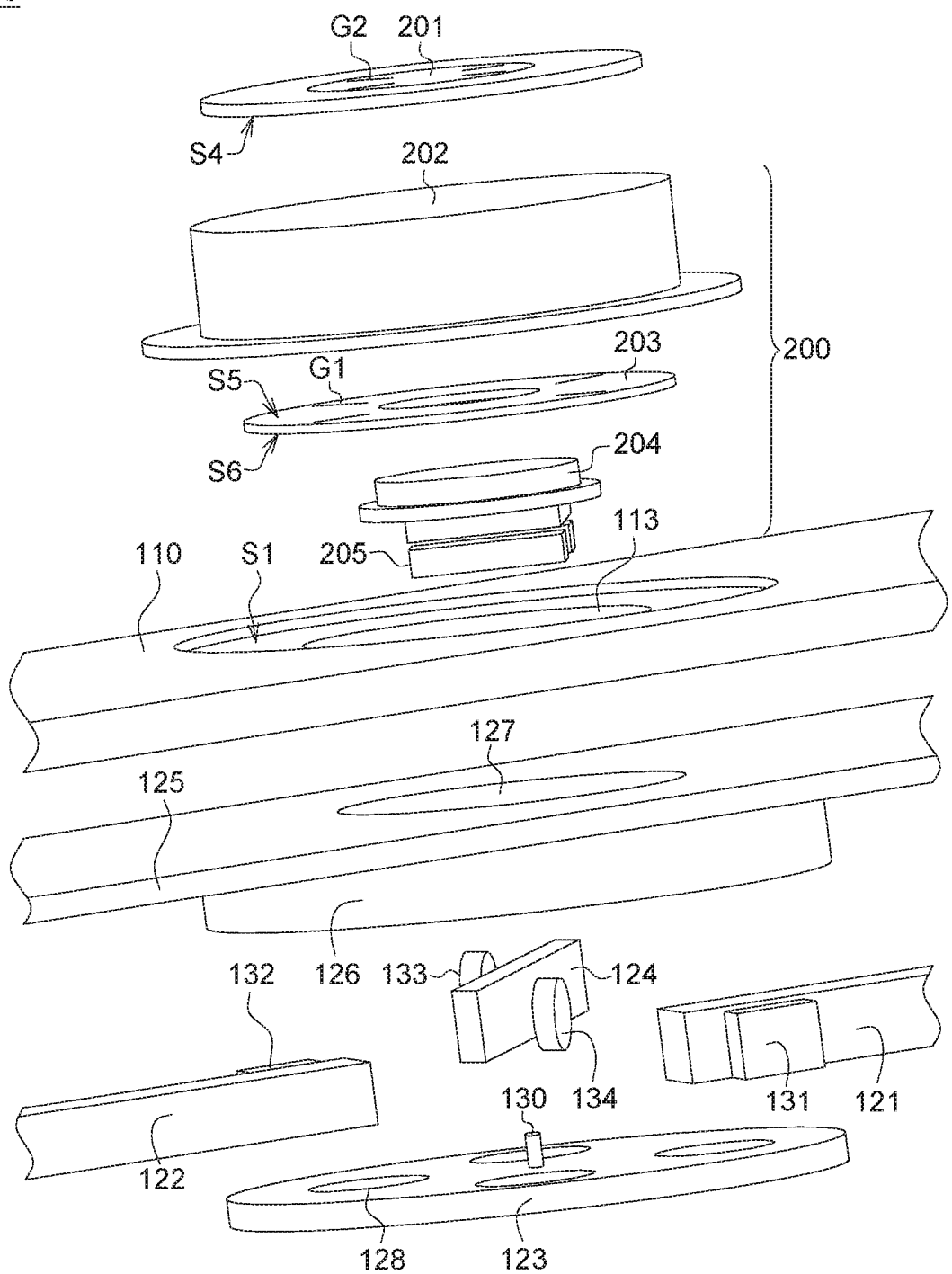
FIG. 5 is a schematic view of an actuating structure of battery safety valve, according to an exemplary embodiment.
Figure 6A:
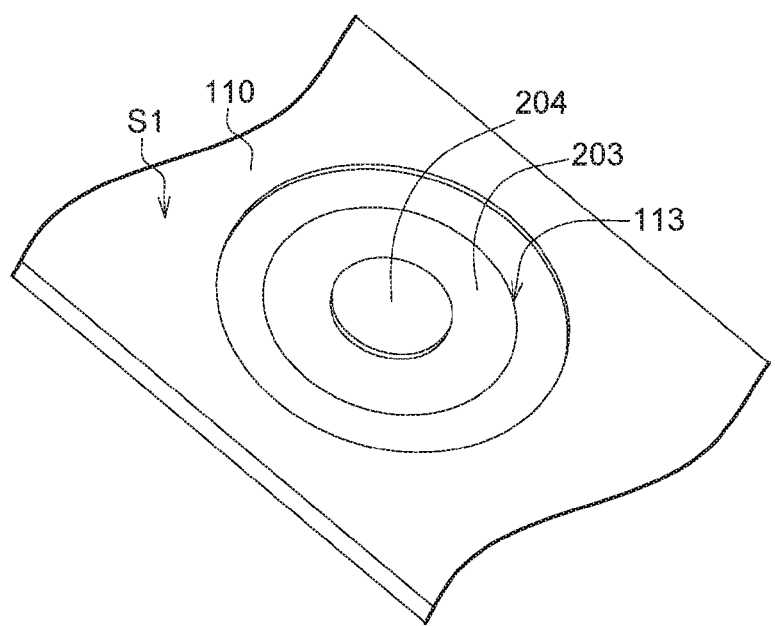
FIG. 6A and FIG. 6B are schematic views illustrating the configuration of partial elements of an air pressure valve.
Figure 6B:
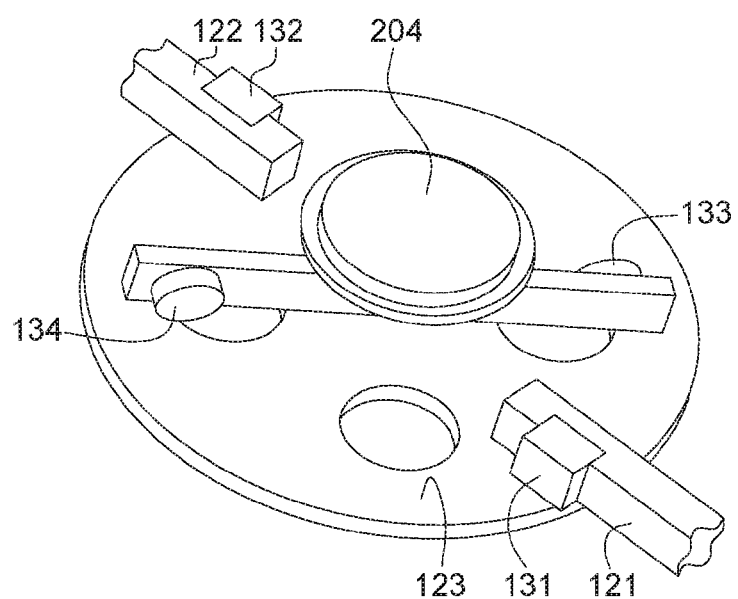

Please refer to FIG. 5, FIG. 6A and FIG. 6B. Wherein FIG. 5 is a schematic view of an actuating structure of battery safety valve 208, according to an exemplary embodiment, and FIG. 6A and FIG. 6B are schematic views illustrating the configuration of partial elements of an air pressure valve 200. In an embodiment, the actuating structure of battery safety valve 208 comprises the end plate 110, a safety valve 201 disposed on the first surface S1 of the end plate 110, the positive-terminal conductive plate 121 disposed on a the second surface S2 of the end plate 110, the negative-terminal conductive plate 122, the ventilate plate 123, the actuating plate 124, and the an insulating layer 125. The end plate 110, the positive terminal conductive plate 121, the negative terminal conductive plate 122, the ventilate plate 123, the actuating plate 124 and the insulating layer 125 are already described in the example 1, and they are not described herein again.

The actuating structure of battery safety valve 208 further comprises an air pressure valve 200 which is disposed between the safety valve 201 and the actuating plate 124. In detail, the air pressure valve 200 has a connecting seat 202 disposed on the fourth surface S4 of the safety valve 201, a burst disc 203, and an external member 204. The connecting seat 202 is between the safety valve 201 and the burst disc 203, and fixed on the first surface S1 of the end plate 110. A center of the burst disc 203 bonds with the external member 204, and the periphery of the burst disc 203 seals the first through hole 113 of the end plate 110 (as shown in FIG. 6A) to form a stress actuating mechanism of the air pressure valve 200. Specifically, there is an opening at the center of the burst disc 203 and the external member 204 is disposed in the opening of the burst disc 203 to seal and bond with each other. In favor of illustration, FIG. 6A only shows the burst disc 203 and the external member 204 disposed in the first through hole 113 of the end plate 110, and FIG. 6B only shows the external member 204, the actuating plate 124, the positive-terminal conductive plate 121, and the negative-terminal conductive plate 122, without showing the end plate 110 and the insulating layer 125.

In an embodiment, there is a position limiting structure 205 at the bottom of the external member 204. The position limiting structure 205 extends to the second surface S2 through the first through hole 113 and fixes the actuating plate 124. Thus, the actuating plate 124 is limited in a fixed position under a normal condition by the safety valve 103.

Besides, the burst disc 203 has a fifth surface S5 and a sixth surface S6, wherein the fifth and the sixth surfaces are opposite to each other. There is at least one pressure broken groove G1 such as V-shaped groove set on the fifth surface S5 or the sixth surface S6, and there is at least one pressure broken groove G2 such as V-shaped groove set on the third surface S3 or the fourth surface S4 of the safety valve 201. The two pressure broken grooves G1 and G2 are thinner than other surrounding planking, therefore when the internal gas of the battery 100 leaks out of the battery 100 through the openings 128 of the ventilate plate 123, the safety valve 201 and the burst disc 203 will break or deform such as bulge outward from the thinner pressure broken groove G1 and G2 to relieve the overload pressure. Furthermore, the external member 204 disposed at the center of the burst disc 203 may be a pressure sensitive sheet, and it may deform when it senses a stress. In detail, when the external member 204 senses the outward air pressure of the internal gas of the battery 100, the external member 204 will deform and release the position limiting structure 205 to rotate the actuating plate 124, so that the positive-terminal conductive plate 121 and the negative-terminal conductive plate 122 contact with each other and this thus conducts an electric discharge to improve the security of the battery 100.

In the embodiment, by using the dual-valve (safety valve and air pressure valve) of the stress actuating mechanism and the separated design of the position limiting structure 205 and the safety valve 201, the air pressure valve 200 may replace the invalid safety valve 201 when the safety valve 201 is invalid or broken by an external force. Therefore, the actuating structure of battery safety valve 208 achieves the function of double protections. Thus, only when the air pressure valve 200 is actually broken or deformed by the internal gas of the battery 100, the air pressure valve 200 will release the actuating plate 124 and improve the security.

In the above-mentioned embodiments of the disclosure, by breaking the safety valve (or air pressure valve) to prevent the internal pressure of the battery 100 from being too high, the actuating structure of battery safety valve also makes the short circuit between the positive terminal and the negative terminal, so that when the battery is in danger, it may discharge immediately, and then the total energy of the battery is no longer fully filled to improve the security.

Figure 7:
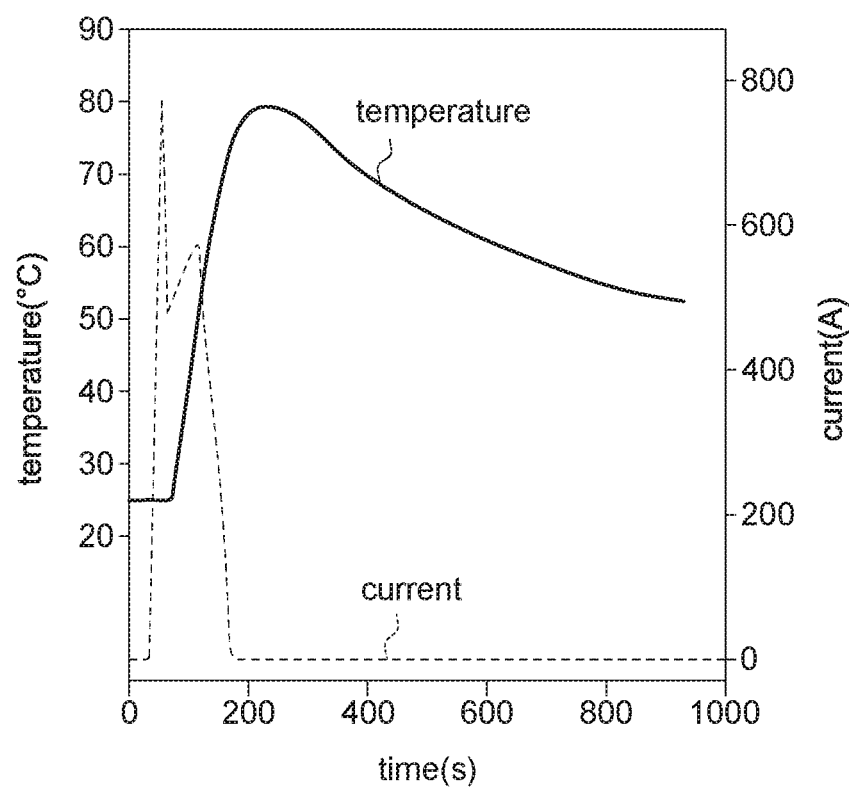
FIG. 7 is a relational graph of discharge and temperature when a battery has a short circuit.

Please refer to FIG. 7. FIG. 7 is a relational graph of discharge and temperature when a battery has a short circuit. In an experiment on simulating the discharge of causing a short circuit in the battery, the positive terminal and the negative terminal of the battery are coupled to an external circuit. It is assumed that an impedance of the external circuit is less than 5 mΩ, and a plate cross-sectional area for providing an electric current passing through is about 3 mm$^2$. Then the battery is electrically charged until the battery has a maximum energy (for example, 4.2V) and a switch is opened to short-circuit the external circuit. At the moment, due to the instantaneous discharge of the battery (the maximum electric current may reach 800 A), the temperature of the interior of the battery or the temperature of the positive terminal and the negative terminal of the battery increases because of the heating of the impedance. According to the temperature measured by a thermometer at the center of the battery and at the positive terminal and the negative terminal, the increased temperature caused by the short circuit may reach about 80° C. and it is still under controls within a permissible range of safety regulations. About 300 seconds later, the battery starts to enter a cooling stage until its temperature decreases to about 50° C.

Thus, as long as the line impedances of the positive-terminal conductive plate and the negative-terminal conductive plate are low and the conductive area is large enough to conduct the current, the heat produced by the battery polar winding combines the heat produced by the short circuit are not enough to let the battery's temperature be greater than the melting temperature (around 120° C.) of the separator of the battery polar winding, so that the battery may keep safe.

It will be apparent to those skilled in the art that various modifications and variations can be made to the disclosed embodiments. It is intended that the specification and examples be considered as exemplars only, with a true scape of the disclosure being indicated by the following claims and their equivalents.

What is claimed is:

1. An actuating structure of battery safety valve, adapted to dispose on a battery, the actuating structure of the battery safety valve comprising:
    an end plate, disposed on a housing of the battery and having a first surface and a second surface, wherein the first and the second surfaces are opposite to each other, and a positive terminal and a negative terminal of the battery penetrate through the end plate;
    a safety valve, disposed on the first surface of the end plate;

a positive-terminal conductive plate, disposed on the second surface and extended from the positive terminal to a first position on the second surface corresponding to the safety valve;

a negative-terminal conductive plate, disposed on the second surface and extended from the negative terminal to the first position on the second surface corresponding to the safety valve;

a ventilate plate, disposed on the second surface, wherein a second position of the ventilate plate corresponds to the first position of the safety valve; and an actuating plate, disposed between the ventilate plate and the safety valve, and restricted in a fixed position under a normal condition by the safety valve;

wherein a rotation shaft is disposed between the actuating plate and the ventilate plate, and when an internal pressure of the battery exceeds a breaking pressure of the safety valve, the actuating plate is released to rotate and contact with the positive-terminal and the negative-terminal conductive plates, respectively, so that an electric connection path is formed between the positive and the negative terminals.

2. The actuating structure of battery safety valve as claimed in claim 1, wherein the first surface of the end plate has a carrying part which is concave toward the second surface and configured to dispose the safety valve, the carrying part has a first through hole, and a diameter of the safety valve is greater than a diameter of the first through hole.

3. The actuating structure of battery safety valve as claimed in claim 1, wherein an insulating layer is disposed on the second surface of the end plate, and the insulating layer isolates between the positive-terminal conductive plate and the end plate, and between the negative-terminal conductive plate and the end plate.

4. The actuating structure of battery safety valve as claimed in claim 3, wherein the insulating layer has a ventilate plate fixed base and a second through hole, the ventilate plate is fixed and disposed in the ventilate plate fixed base, and the second through hole is disposed between the ventilate plate and the safety valve.

5. The actuating structure of battery safety valve as claimed in claim 1, wherein the end plate has a ventilate plate fixed base and a first through hole, the ventilate plate fixed base is disposed on the second surface of the end plate, the ventilate plate is fixed and disposed in the ventilate plate fixed base, and the first through hole is deposed between the ventilate plate and the safety valve.

6. The actuating structure of battery safety valve as claimed in claim 1, wherein the safety valve has a third surface and an opposite fourth surface, a position limiting structure is deposed on the fourth surface of the safety valve and the end plate has a first through hole, the position limiting structure extends to the second surface through the first through hole and fixes the actuating plate, so that the actuating plate is limited in the fixed position under the normal condition.

7. The actuating structure of battery safety valve as claimed in claim 6, wherein at least one pressure broken groove sets on the third surface or the fourth surface, and enables the safety valve to break.

8. The actuating structure of battery safety valve as claimed in claim 1, wherein a surface of the ventilate plate has a plurality of openings penetrating though the ventilate plate, and the rotation shaft is disposed at a center of the ventilate plate.

9. The actuating structure of battery safety valve as claimed in claim 1, wherein two ends of the actuating plate respectively have a first magnetic element and a second magnetic element, respectively, and the first magnetic element and the second magnetic element are made from a permeable material or a magnetized material.

10. The actuating structure of battery safety valve as claimed in claim 9, wherein an end of the positive-terminal conductive plate which extends to the position on the second surface where the safety valve corresponds to has a first magnetic matter, and an end of the negative-terminal conductive plate which extends to the position on the second surface where the safety valve corresponds to has a second magnetic matter, wherein the first magnetic matter and the first magnetic element attract each other by a magnetic force, and the second magnetic matter and the second magnetic element attract each other by another magnetic force, so as to drive the two ends of the actuating plate to rotate with respect to the rotation shaft.

11. The actuating structure of battery safety valve as claimed in claim 10, wherein the first magnetic matter and the second magnetic matter are made from a permeable material or a magnetized material.

12. The actuating structure of battery safety valve as claimed in claim 1, wherein a spring is set between the actuating plate and the ventilate plate to drive the actuating plate relative to rotate with respect to the rotation shaft.

13. The actuating structure of battery safety valve as claimed in claim 12, wherein the spring is a volute spiral spring or a compression spring, and one end of the spring is fixed on the actuating plate, and the other end of the spring is fixed on the ventilate plate.

14. The actuating structure of battery safety valve as claimed in claim 1, further including an air pressure valve disposed between the safety valve and the actuating plate.

15. The actuating structure of battery safety valve as claimed in claim 14, wherein the air pressure valve has a connecting seat, a burst disc, and an external member, the connecting seat is between the safety valve and the burst disc and fixed on the end plate, a center of the burst disc bonds with the external member and the periphery of the burst disc seals the first through hole of the end plate, and a position limiting structure is disposed at a bottom of the external member to fix the actuating plate, so that the actuating plate is limited in the fixed position under the normal condition.

16. The actuating structure of battery safety valve as claimed in claim 15, wherein the burst disc has a fifth surface and a sixth surface, wherein the fifth and the sixth surfaces are opposite to each other, and at least one pressure broken groove sets on the fifth surface or the sixth surface and enables the burst disc to break.

17. The actuating structure of battery safety valve as claimed in claim 15, wherein the external member is a pressure sensitive sheet, and deforms when it senses a stress.

18. The actuating structure of battery safety valve as claimed in claim 15, wherein two ends of the actuating plate respectively have a first magnetic element and a second magnetic element, and the first magnetic element and the second magnetic element are made from a permeable material or a magnetized material.

19. The actuating structure of battery safety valve as claimed in claim 18, wherein an end of the positive-terminal conductive plate which extends to the position on the second surface where the safety valve corresponds to, has a first magnetic matter, and an end of the negative-terminal conductive plate which extends to the position on the second surface where the safety valve corresponds to, has a second magnetic matter, wherein the first magnetic matter and the first magnetic element attract each other by a magnetic force, and the second magnetic matter and the second magnetic element attract each other by another magnetic force, so as to drive the two ends of the actuating plate to rotate with respective to the rotation shaft.

20. The actuating structure of battery safety valve as claimed in claim 15, wherein a spring is set between the actuating plate and the ventilate plate to drive the actuating plate to rotate with respective to the rotation shaft.

* * * * *